United States Patent [19]

Limoni

[11] Patent Number: 4,962,842
[45] Date of Patent: Oct. 16, 1990

[54] APPARATUS FOR CONVERTING A MULTI-ROW STREAM OF UPRIGHT ARTICLES, IN PARTICULAR BOTTLES, TO A SINGLE ROW

[75] Inventor: Alfredo Limoni, Parma, Italy

[73] Assignee: Simonazzi A. & L. S.p.A., Parma, Italy

[21] Appl. No.: 265,006

[22] Filed: Oct. 31, 1988

[30] Foreign Application Priority Data

Dec. 4, 1987 [IT] Italy .................................. 3719 A/87

[51] Int. Cl.$^5$ ............................................. B65G 47/52
[52] U.S. Cl. .................................. 198/443; 198/803.16
[58] Field of Search ............... 198/452, 453, 443, 392, 198/803.16

[56] References Cited

U.S. PATENT DOCUMENTS

| | | | |
|---|---|---|---|
| 1,430,132 | 9/1922 | Wilberts | 198/453 |
| 2,941,651 | 6/1960 | Hutter et al. | 198/803.16 X |
| 3,049,215 | 8/1962 | Hutter et al. | 198/443 |
| 3,133,624 | 5/1964 | Craig | 198/443 |
| 3,297,133 | 1/1967 | Sterling | 198/443 X |
| 3,471,000 | 10/1969 | Bodolay et al. | 198/803.16 X |

FOREIGN PATENT DOCUMENTS 3500660 7/1986 Fed. Rep. of Germany ...... 198/453

Primary Examiner—Joseph E. Valenza
Assistant Examiner—D. Glenn Dayoan
Attorney, Agent, or Firm—Fleit, Jacobson, Cohn, Price, Holman & Stern

[57] ABSTRACT

An apparatus is disclosed for converting a multi-row stream row of upright articles, such as bottles, into a single row. The apparatus includes a rectilinear supply conveyor for supplying the upright articles in adjacent rows, a rotating conical surface located adjacent to the supply conveyor which receives the articles from the supply conveyor, a removal conveyor, and a frame-fixed guide surface extending spirally outwardly along the conical surface in the direction of rotation of the conical surface. The supply conveyor having a guide surface which extends in an arc at an end region in a direction opposite to a spiral arc of the frame-fixed guide surface and which merges into the spiral arc of the frame-fixed guide surface for continuous supply of upright articles to the conical surface. The guide surface of the supply conveyor extends radially inwardly towards a center of the conical surface and terminates radially inwardly of an outer peripheral edge of the conical surface.

2 Claims, 5 Drawing Sheets

APPARATUS FOR CONVERTING A MULTI-ROW STREAM OF UPRIGHT ARTICLES, IN PARTICULAR BOTTLES, TO A SINGLE ROW

BACKGROUND OF THE INVENTION

The invention relates to an apparatus for converting a multi-row stream of upright articles, in particular bottles, into a single row comprising a rectilinear supply conveyor provided with guide surfaces, an intermediate conveyor consisting of a rotating conical surface, a removal conveyor and a frame-fixed guide surface which in the direction of rotation of said surface extends spirally outwardly and intercepts the articles.

Such an apparatus is known from DE-PS 3,500,660. In the known apparatus a multi-row stream of upright bottles is moved on a rectilinear supply conveyor provided with guide faces. The rectilinear region of the supply conveyor is followed by a circular arcuate region which extends over an angle range of 90°. Disposed in the center point of the circular arcuate section of the supply conveyor is the center point of the rotating surface, the outer circular boundary of which is tangential to the end of the rectilinear region of the supply conveyor and which adjoins the inner portion of the circular arcuate region of the supply conveyor. A frame-fixed outer guide surface running spirally inwardly extends over the circular region of the supply conveyor. A further inner frame-fixed guide surface starts at the end of the rectilinear region of the supply conveyor, extends from there approximately semicircularly to the center point of the supply conveyor and then continues as substantially spirally outwardly running guide surface. At the side of the intermediate conveyor opposite the circular region of the supply conveyor a removal conveyor partially surrounding the intermediate conveyor is arranged and carries away the single-row bottle stream produced by the intermediate conveyor.

US-PS 1,430,132 discloses an apparatus for converting a multi-row stream of upright articles to a single row in which said articles are brought onto a circular intermediate conveyor having a conical surface. On the side of the intermediate conveyor lying opposite the supply region a short guiding surface is disposed and is spaced from the outer boundary face of the supply conveyor such that between the two guide surfaces there is room for exactly one row of articles. The apparatus known from US-PS 1,430,132 has the following disadvantages: firstly, the articles to be singled out must in some cases run round the intermediate conveyor several times before they are carried off in a single row stream; the apparatus thus does not operate efficiently. Secondly, the articles touch each other on the removal conveyor; thus, between the articles arranged in a single row there are no intermediate spaces as may be necessary for subsequent further processing.

US-PS 3,049,215 and US-PS 2,941,651 disclose an apparatus for converting a multi-row stream of articles, in particular ore and rock lumps, to a single row. The articles are supplied by a supply conveyor to an intermediate conveyor The latter consists of a rotating conical surface. A frame-fixed guide surface extending spirally outwardly in the direction of rotation of said conical surface intercepts the articles. Said guide surface is however made only slightly spiral. The articles can thus strike against the guide surface with a relatively large radial velocity component The apparatuses known from said patent specifications are therefore not suitable for separating out sensitive articles such as in particular bottles. Other articles with which there is a danger of falling over, for example cans, also cannot be singled out with the apparatuses known from U.S. Pat. Nos. 3,049,215 and 2,941,651. On the contrary, the known apparatuses are suitable only for converting to a single row articles of the type where the position is not important, i.e. which may tip over, for example ore or rock lumps.

SUMMARY OF THE INVENTION

The problem underlying the invention is to provide an apparatus of the type indicated at the beginning which is of simple construction and which permits a high bottle throughput.

According to the invention this problem is solved in that between the supply conveyor and the intermediate conveyor a guide surface is provided which extends in an arc opposite to the spiral arc in the direction of the center of the surface and then merges into the spiral. This enables the articles to be supplied continuously and without abrupt movements to the spiral guide surface. Thus, even when bottles are being processed they do not tip over. The bottles are first brought relatively close to the center of the conical surface. From there, due to the slope descending force and the centrifugal force they follow the spiral guide surface outwardly. With this radially outwardly directed movement the bottles move into the regions of the conical surface which have a higher velocity in the tangential direction so that the bottles are thereby increasingly separated and finally transferred to a single row. In addition, the bottles carried away in a single row are also spaced from each other as may be useful or absolutely essential for further processing.

An advantageous further development of the invention is characterized in that the guide surface runs in the end region of the supply conveyor and in the initial region of the intermediate conveyor in radial direction towards the center point of the surface of the intermediate conveyor.

A further advantageous development of the invention resides in that the rotation axis of the rotating surface of the intermediate conveyor is inclined with respect to the vertical. The inclination of the axis of rotation is preferably in a direction lying 90° behind the supply conveying direction. By the inclination of the axis of rotation of the rotating surface of the intermediate conveyor the slope descending force can be varied on the conical surface. The cone angle and the inclination angle of the rotation axis are combined with each other. The maximum inclination angle is the sum of the cone angle and rotation axis inclination angle. The minimum slope descending force angle consists of the difference between the cone angle and the angle of the inclination of the cone-rotation axis; this difference may be equal to zero in the extreme case. Preferably, the inclination of the axis of rotation is set so that in the initial region of the slope descending movement of the bottles a larger slope descending force angle is achieved because in this region the static friction can still be active which is of course greater that sliding friction. By corresponding inclination of the rotation axis of the conical surface the effective inclination angle can also be made particularly great in the region in which a particularly intensive pressing together of the bottles takes place.

The inclination of the rotation axis and the "steepness" of the spiral (i.e. of the spiral guide surface) must be adapted to each other.

BRIEF DESCRIPTION OF THE DRAWINGS

Examples of embodiment of the invention will be explained hereinafter in detail with reference to the attached drawings, wherein.

DESCRIPTION OF THE PREFERRED EMBODIMENT

Figure 1:
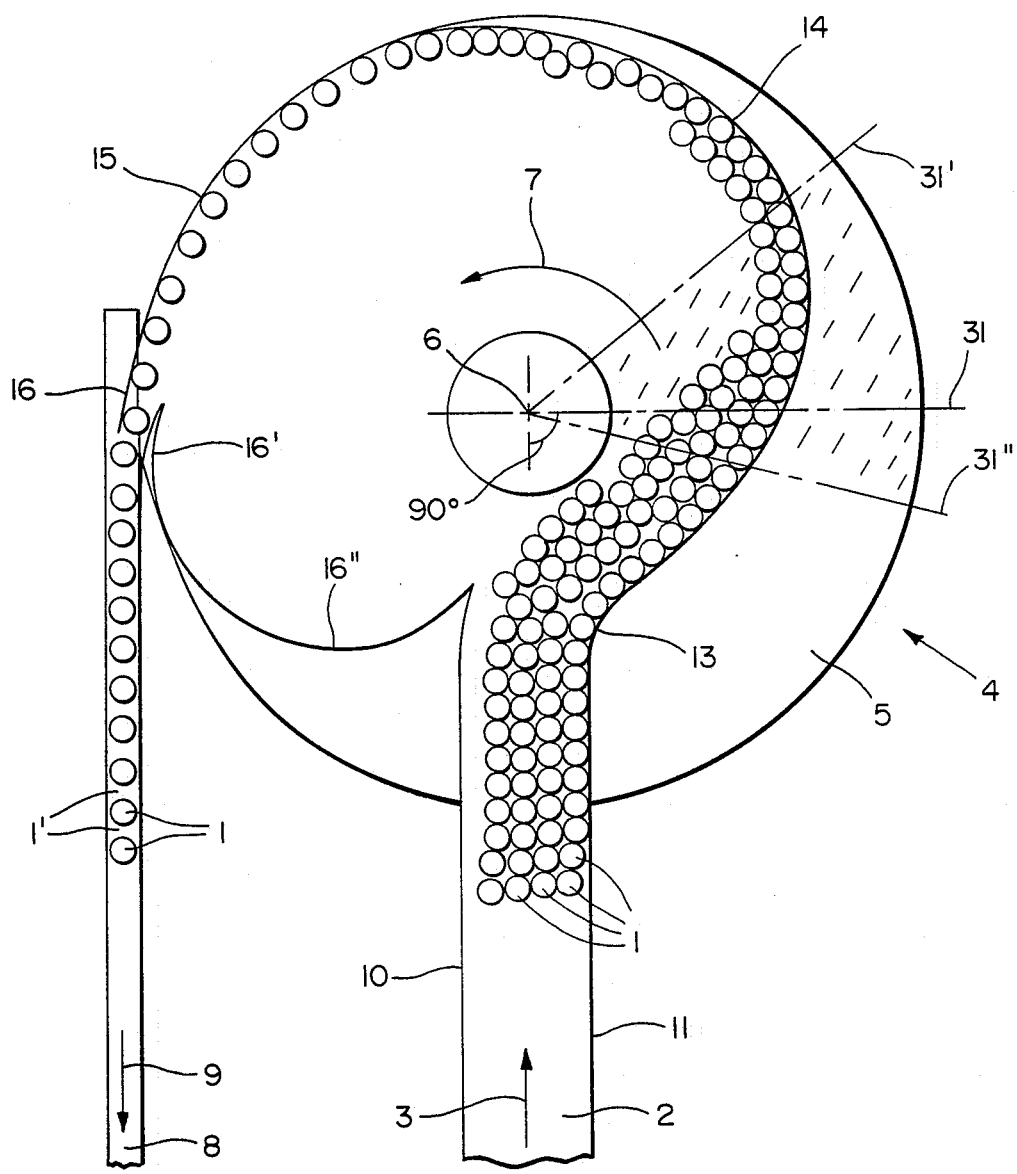
FIG. 1 is an example of embodiment seen in plan view.

In the apparatus illustrated in FIG. 1 the bottles 1 are supplied on the supply conveyor 2 in the direction of the arrow 3 in four to five rows adjacent each other to the intermediate conveyor designated as a whole by four. The intermediate conveyor consists of a conical surface 5 rotating about a vertical rotation axis 6. The cone is outwardly inclined. The conical surface 5 is followed tangentially by a removable conveyor 8 on which the bottles 1 are transported in the direction of the arrow 9. Between the bottles 1 on the removal conveyor 8 there are intermediate spaces 1'. The surface 5 rotates in the direction of the arrow 7.

The rectilinear supply conveyor 2 is defined by two guide surfaces 10, 11 which run parallel to each other. The guide surface 11 extends beyond the outer edge of the surface 5 and then merges into a circular arcuate region 13 which extends over a region of about 45°. The region 13 is followed by a spirally outwardly extending frame-fixed guide surface 14 which intercepts the articles 1 and which encloses an angle of about 225°. The articles 1 are forced radially outwardly both by the slope descending force and the centrifugal force and intercepted by the spiral 14. With the spiral the bottles 1 come into regions of increasingly large tangential velocity, thereby being separated into increasingly less rows and finally into a single row. The rearmost region 15 of the guide surface 14 seen in the direction of rotation 7 extends substantially circular arcuate. The guide surface ends in the region 16 which is inclined outwardly in such a manner that transfer of the bottles to the removal conveyor 8 is possible. On the side opposite the region 16 a short region 16' is disposed which also serves for guiding the (meanwhile) single bottle row.

The arc 13 is directed oppositely to the spiral arc 14. The guide surfaces 10 and 11 run in the end region of the supply conveyor 2 and in the initial region of the intermediate conveyor 4 in radial direction towards the center point 6 of the surface 5 of the intermediate conveyor 4.

The rotation axis 6 of the conical surface 5 runs in a vertical direction. It may however also be inclined with respect to the vertical. Preferably, this inclination of the rotation axis 6 is such that it lies in the plane 31. The plane 31 is a vertical plane which extends through the center point 6 of the surface 5. The angle between the supply direction 3 of the supply conveyor 2 and the plane 31 is preferably about 90°. This angle may however also be smaller. If the rotation axis of the surface 5 is inclined in the plane 31 the effective descending force angle acting on the bottles 1 is greatest in the direction of the plane 31 and smallest in the opposite direction. Between these two directions the effective angle acting on the bottles 1 changes continuously.

Figure 2:
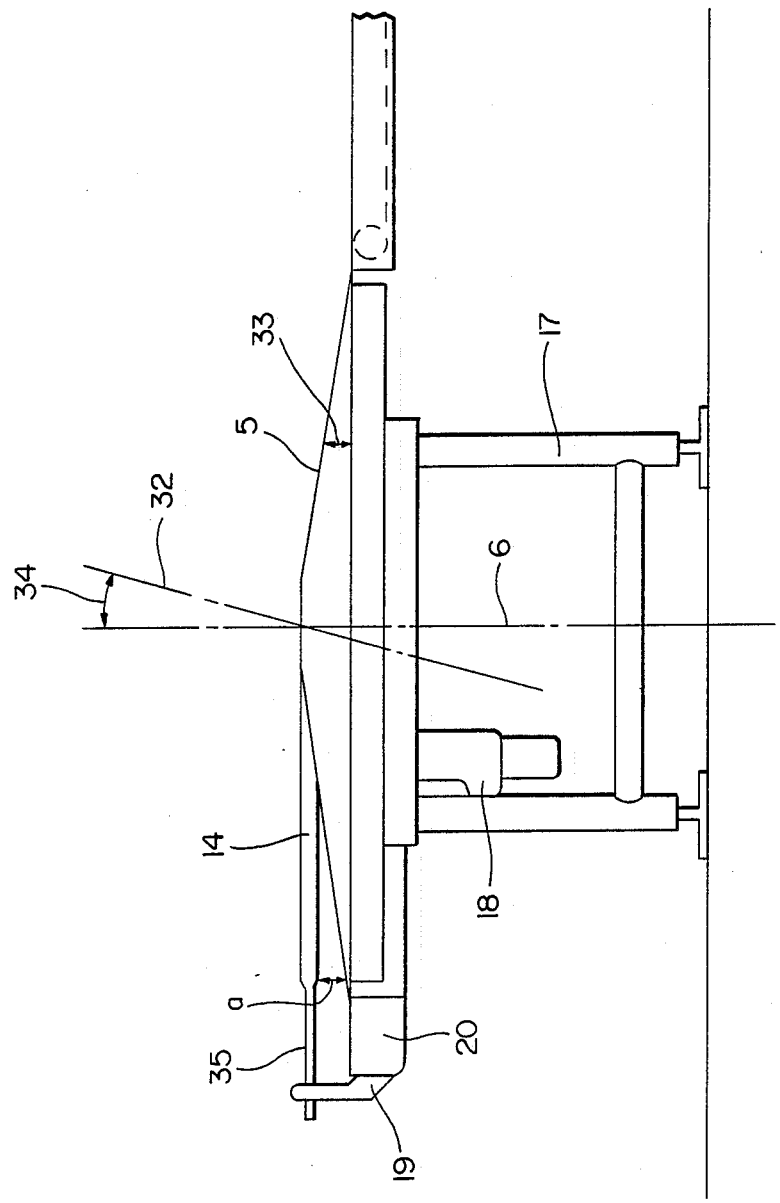
FIG. 2 is an example of embodiment seen in side elevation.

FIG. 2 shows the apparatus of FIG. 1 in side elevation. Identical parts are provided with the same reference numerals and consequently need not be explained again. The conical surface 5 is disposed on the frame 17 and rotates about the rotation axis 6. The surface 5 is driven by the motor 18. The spiral guide surface 14 extends at a distance a from the conical surface 5. Provided space from the surface 5 is a vertical interception surface 19 which is connected to the frame 17. The distance a is made large enough for fallen-over bottles to be able to roll beneath the spiral guide surface 14. The baffle plates 19 prevent the rolling bottles from falling down. The bottles are collected in the channel 20 and can be transported away from there.

The rotation axis of the conical surface 5 may be inclined by an angle 34 to the vertical as indicated by the reference numeral 32. The angle of the conical surface 5 to the horizontal is denoted by 33.

The spiral guide surface 14 is secured to spaces 35 which in turn are mounted on the frame-fixed baffle plates 19.

The effective slope descending force angle acting on the bottles is made up of the sum or difference of the inclination angle 34 and the cone angle 33.

Figure 3:
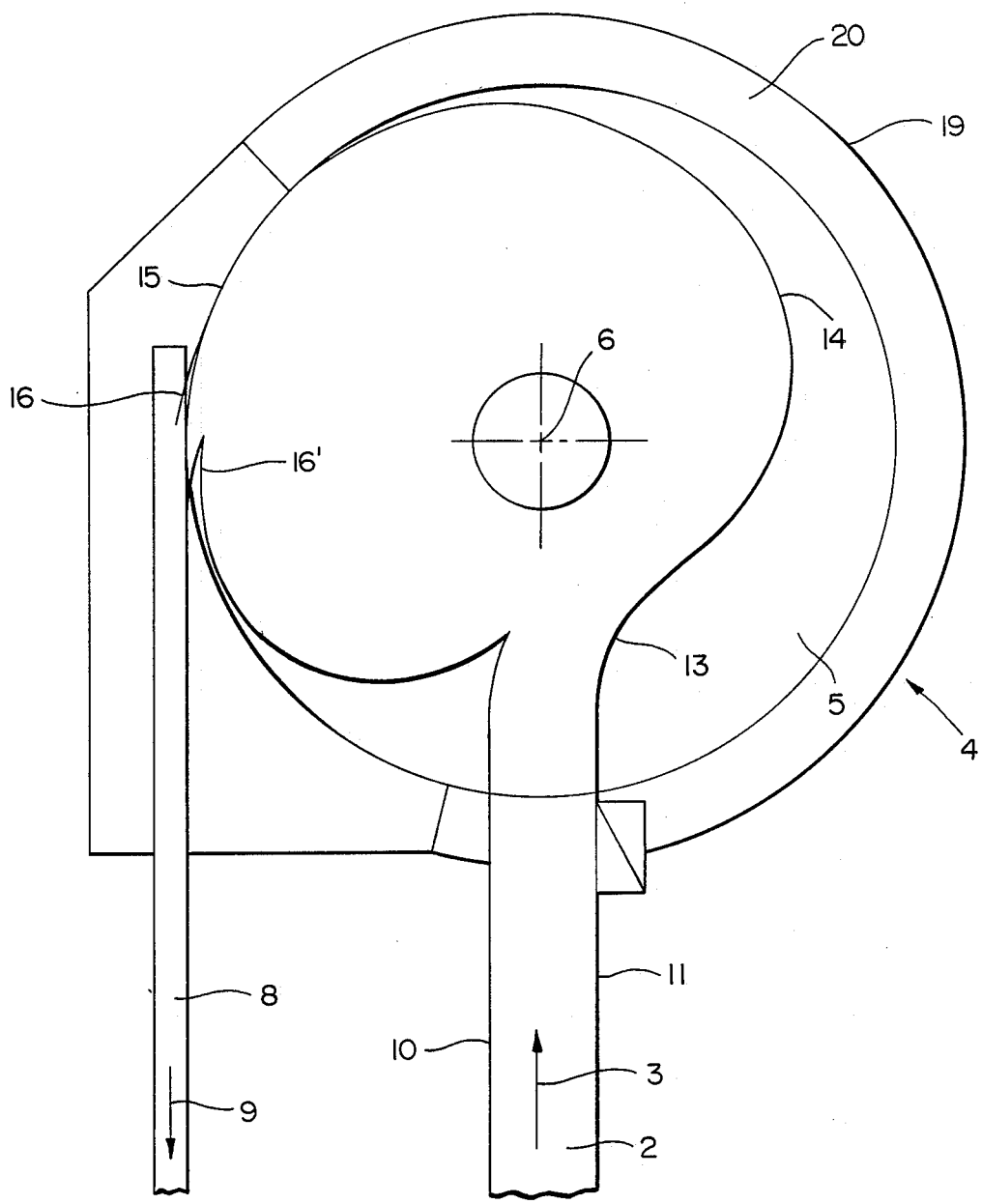
FIG. 3–FIG. 7 show further examples of embodiment, each in plan view.
Figure 4:
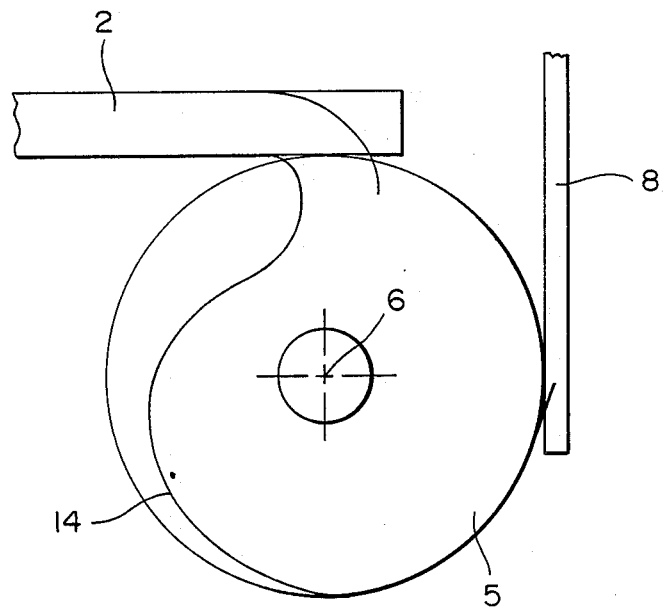
Figure 5:
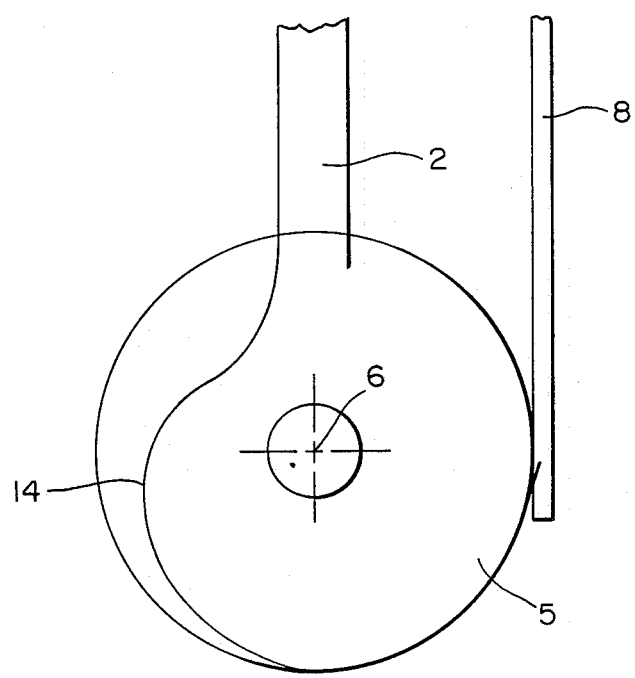
Figure 6:
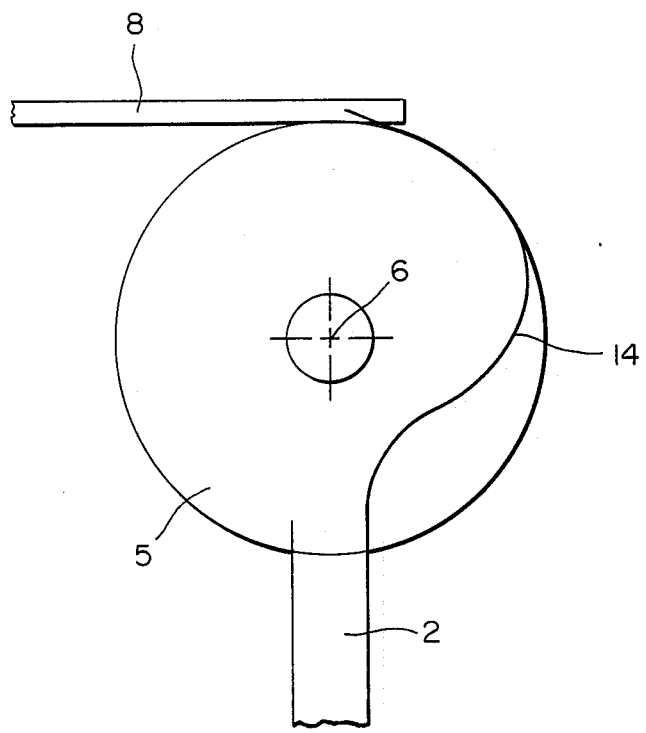
Figure 7:
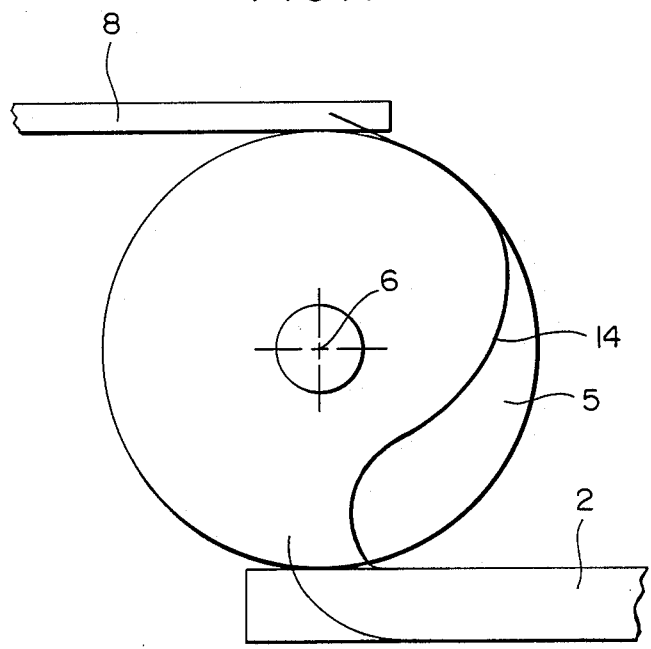

FIG. 3 shows a further example of embodiment in which the parts identical to FIGS. 1 and 2 are denoted by the same reference numerals so that reference can be made to the description of FIGS. 1 and 2. The same applies to FIGS. 4 to 7.

I claim:

1. Apparatus for converting a multi-row stream of upright articles, in particular bottles, into a single row, said apparatus comprising:

a rectilinear supply conveyor for supplying upright articles in adjacent rows, an intermediate conveyor including a rotating conical surface located adjacent to said supply conveyor, a removal conveyor, a frame-fixed guide surface extending spirally outwardly along said conical surface in the direction of rotation of said conical surface, a guide surface of said supply conveyor extends in an arc at an end region in a direction opposite to a spiral arc of said frame-fixed guide surface and then merges into said spiral arc of said frame-fixed guide surface for continuous supply of upright articles to said conical surface from said supply conveyor while the upright articles are in contact with said guide surface and with at least some upright articles contacting said arc at said end region and conveying the upright articles to said conical surface with said at least some upright articles in contact with said frame fixed guide surface so as to avoid abrupt movements onto said frame fixed guide surface, said guide surface at said end region of said supply conveyor extends radially inwardly towards a center of said conical surface of said intermediate conveyor and terminating radially inwardly of an outer peripheral edge of said conical surface for delivery of upright articles to said conical surface.

2. Apparatus for converting a multi-row stream of upright articles, in particular bottles, into a single row, said apparatus comprising:

a rectilinear supply conveyor for supplying upright articles in adjacent rows, an intermediate conveyor including a rotating conical surface located adjacent to said supply conveyor, a central rotation axis of said rotating conical surface being inclined with respect to the vertical to increase an effective descending force acting on conveyed upright articles, a removal conveyor, a frame-fixed guide surface extending spirally outwardly along said conical surface in the direction of rotation of said conical surface, a guide surface of said supply conveyor extends in an arc at an end region in a direction opposite to a spiral arc of said frame-fixed guide surface and then merges into said spiral arc of said frame-fixed guide surface for continuous supply of upright articles to said conical surface from said supply conveyor while the upright articles are in contact with said guide surface and with at least some upright articles contacting said arc at said end region and conveying the upright articles to said conical surface with said at least some upright articles in contact with said frame fixed guide surface so as to avoid abrupt movements onto said frame fixed guide surface, said guide surface at said end region of said supply conveyor extends radially inwardly towards a center of said conical surface of said intermediate conveyor and terminating radially inwardly of an outer peripheral edge of said conical surface for deliver of upright articles to said conical surface.

* * * * *